(12) United States Patent
Lee et al.

(10) Patent No.: US 9,792,506 B2
(45) Date of Patent: Oct. 17, 2017

(54) LANE CHANGE DETERMINING APPARATUS, JUNCTION ENTRY DETERMINING APPARATUS AND METHOD THEREOF

(71) Applicant: Hyundai Motor Company, Seoul (KR)

(72) Inventors: Dong Gu Lee, Seoul (KR); Hyun-Jae Yoo, Seoul (KR); Sihyoung Lee, Seongnam (KR); Chang Ho Kim, Yongin (KR); Minyong Shin, Seoul (KR)

(73) Assignee: Hyundai Motor Company, Seoul (KR)

( * ) Notice: Subject to any disclaimer, the term of this patent is extended or adjusted under 35 U.S.C. 154(b) by 351 days.

(21) Appl. No.: 14/317,526

(22) Filed: Jun. 27, 2014

(65) Prior Publication Data

US 2015/0154458 A1 Jun. 4, 2015

(30) Foreign Application Priority Data

Dec. 3, 2013 (KR) .......................... 10-2013-0149243

(51) Int. Cl.
*H04N 7/00* (2011.01)
*G06K 9/00* (2006.01)
(52) U.S. Cl.
CPC ................. *G06K 9/00798* (2013.01)
(58) Field of Classification Search
CPC ................................................ G06K 9/00798
See application file for complete search history.

(56) References Cited

U.S. PATENT DOCUMENTS

| | | | | |
|---|---|---|---|---|
| 2002/0188392 A1* | 12/2002 | Breed | ..................... | B60C 11/24 701/45 |
| 2009/0174577 A1* | 7/2009 | Nakamura | ......... | G06K 9/00798 340/995.1 |
| 2012/0226392 A1* | 9/2012 | Kataoka | ................. | G08G 1/167 701/1 |
| 2015/0066241 A1* | 3/2015 | Akiyama | .............. | B60W 10/18 701/1 |

FOREIGN PATENT DOCUMENTS

| | | |
|---|---|---|
| JP | H1044827 A | 2/1998 |
| JP | 2012-106735 A | 6/2012 |
| KR | 10-2011-0002288 A | 1/2011 |
| KR | 10-2012-0003188 | 1/2012 |
| KR | 10-2012-0018614 | 3/2012 |
| KR | 10-2013-0015983 | 2/2013 |
| KR | 10-2013-0063764 | 6/2013 |

* cited by examiner

*Primary Examiner* — Tat Chio
(74) *Attorney, Agent, or Firm* — Mintz Levin Cohn Ferris Glovsky and Popeo, P.C.; Peter F. Corless

(57) ABSTRACT

A junction (JC) entry determining method and a lane change determining method are provided. The JC entry determining method includes acquiring, by a controller, positional information of a vehicle surrounding object using radar and determining whether a junction entrance is present using the positional information. A width of a right space of the vehicle is determined using the positional information and a vehicle surrounding environment image is captured. The controller is also configured to determine a type of right lane of the vehicle using the captured image and determine whether the vehicle enters the JC based on whether the JC entrance is present, the width of the right space of the vehicle, and the type of lane.

8 Claims, 12 Drawing Sheets

LANE CHANGE DETERMINING APPARATUS, JUNCTION ENTRY DETERMINING APPARATUS AND METHOD THEREOF

CROSS-REFERENCE TO RELATED APPLICATION

This application is based on and claims priority from Korean Patent Application No. 10-2013-0149243, filed on Dec. 3, 2013 in the Korean Intellectual Property Office, the disclosure of which is incorporated herein in its entirety by reference.

BACKGROUND

Field of the Invention

The present invention relates to a method of determining whether a lane change is performed and whether a vehicle enters a junction, when the vehicle is being driven on a road.

Description of the Prior Art

Recently, with the development of electronic technology, various systems for convenience and stability of a driver have been developed and applied. In particular, an autonomous driving system which enables a driver to automatically drive a vehicle to a desired destination has been developed. The autonomous driving system may improve driver convenience, but requires a technology of solving a risk such as a system error and coping with other situations while driving. The autonomous driving system requires a technology of determining whether a lane change is performed and whether a vehicle enters a junction (JC), when the vehicle is being driven in a current driving lane and on an expressway.

SUMMARY

Accordingly, the present invention provides a lane change determining apparatus, a JC entry determining apparatus, and a method thereof that may determine whether a lane change is performed and whether a vehicle enters a junction, when the vehicle is being driven on a road.

In one aspect of the present invention, a method of determining whether a lane change is performed may include: capturing an image of a vehicle surrounding environment; determining a type of left lane or right lane of the vehicle using the captured image; acquiring positional information of a vehicle surrounding object using radar, determining a width of a left space or a right space of the vehicle using the positional information; and determining whether the lane change is performed based on the type of lane and the width.

In the determination of whether the lane change is performed, when the type of lane is a dashed line and the width of the space is equal to or greater than a preset width, the lane change may be determined. In addition, when the type of lane is the dashed line and a condition in which the width of the space is equal to or greater than the preset width is maintained at a preset time or greater, the lane change may be determined. The preset width may be set to be a width equal to or greater than a width of a lane along which the vehicle is being driven.

In another aspect of the present invention, a junction (JC) entry determining method may include: acquiring positional information of a vehicle surrounding object using radar, determining whether a junction (JC) entrance is present using the positional information; determining a width of a right space of the vehicle using the positional information; capturing an image of a vehicle surrounding environment; determining a type of right lane of the vehicle using the captured image; and determining whether the vehicle enters the JC based on whether the JC entrance is present, the width of the right space of the vehicle, and the type of lane.

In the determination of whether the vehicle enters the JC, when the JC entrance is present, the width of the right space of the vehicle is equal to or greater than a preset width, and the type of lane is a double lane, the entrance to the JC may be determined. In addition, when the JC entrance is present, the width of the right space of the vehicle is equal to or greater than the preset width, and a condition in which the type of lane is the double lane is maintained for a preset time, the entrance to the JC may be determined.

The JC entry determining method may further include: determining whether the vehicle enters the JC when the vehicle enters the JC when the vehicle changes a lane to the right lane. The JC entry determining method may further include: determining that the vehicle exists from the JC when the left lane of the vehicle is the double lane while the vehicle is being driven in the JC and the width of the left space of the vehicle is equal to or greater than the preset width. The JC entry determining method may further include: determining whether the vehicle exits from the JC when the vehicle exits from the JC when the vehicle changes a lane to the left lane.

The positional information may include a distance and an angle value from the vehicle of the vehicle surrounding object; and the determination of whether the JC entrance is present may include: detecting positional information on a guardrail in the positional information; aligning the detected positional information in an angle order and determining whether the JC entrance is present, in response to determining that a discontinuous point at which the distance is increased or reduced to a preset distance or greater is present by comparing the distances of the aligned positional information. The determination of whether the JC entrance is present may include: determining that the JC entrance is present when a right guardrail of the vehicle is not parallel with a left lane or a left guardrail of the vehicle.

In another aspect of the present invention, a lane change determining apparatus may include: an imaging device configured to capture an image of a vehicle surrounding environment; a lane recognizer configured to determine a type of left lane or right lane of the vehicle using the captured image; a radar sensor configured to acquire positional information of a vehicle surrounding object using radar, a space determiner configured to determine a width of a left space or a right space of the vehicle using the positional information; and a controller configured to determine whether the lane of the vehicle is changed based on the type and width of lane.

In still another aspect of the present invention a JC entry determining apparatus may include: a radar sensor configured to acquire positional information of a vehicle surrounding object using radar, a JC determiner configured to determine whether a JC entrance is present using the positional information; a space determiner configured to determine a width of a right space of the vehicle using the positional information; an imaging device configured to capture an image of a vehicle surrounding environment a lane recognizer configured to determine a type of right lane of the vehicle using the imaged image; and a controller configured to determine whether the vehicle enters the JC based on whether the JC entrance is present, the width of the right space of the vehicle, and the type of lane.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION

Figure 1:
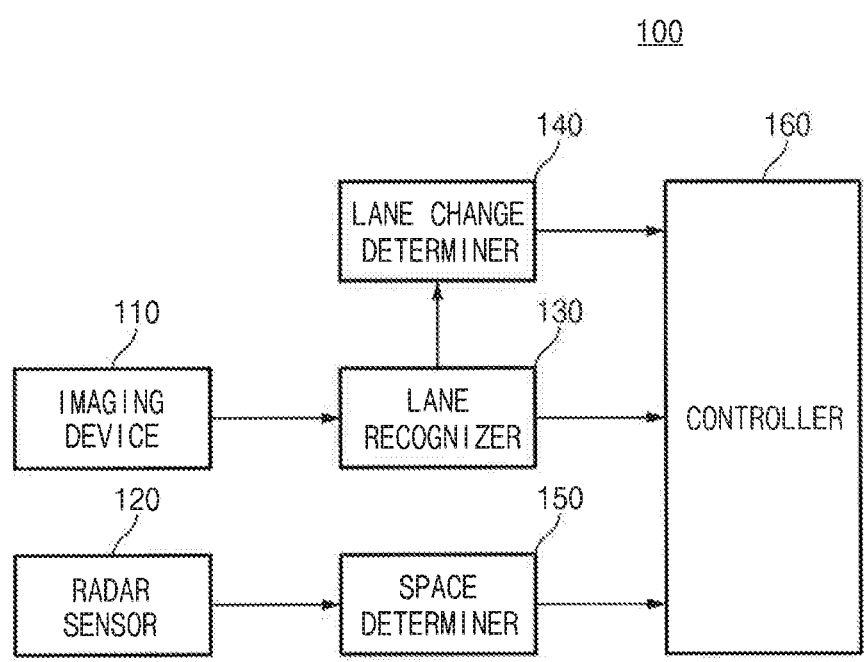
FIG. 1 is an exemplary block diagram illustrating a configuration of a lane change determining apparatus according to an exemplary embodiment of the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the tem "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, exemplary embodiments of the present invention will be described in detail with reference to the accompanying drawings.

FIG. 1 is an exemplary block diagram illustrating a configuration of a lane change determining apparatus according to an exemplary embodiment of the present invention. Referring to FIG. 1, a lane change determining apparatus 100 may include an imaging device 110, a radar sensor 120, a lane recognizer 130, a lane change determiner 140, a space determiner 150, and a controller 160. The controller 160 may be configured to operate the imaging device 110, the radar sensor 120, the lane recognizer 130, the lane change determiner 140, and the space determiner 150.

The imaging device 110 may be configured to capture an image of a vehicle surrounding environment. The imaging device 110 may be configured of a plurality of cameras configured to photograph the vehicle surrounding environment in all directions (360°). For example, the imaging device 110 may be configured of four cameras mounted on a front surface, a rear surface, a left side, and a right side of a vehicle. Further, the imaging device 110 may be configured of a wide angle camera configured to capture an image of the vehicle surrounding environment using a smaller number of cameras (e.g., less than four). The radar sensor 120 may be configured to acquire positional information of a vehicle surrounding object using radar. The positional information acquired by the radar sensor 120 may include a distance r and an angle value θ for the vehicle surrounding object. More accurately, the positional information acquired by the radar sensor 120 may include the distance r and the angle value θ for the vehicle surrounding object from the radar sensor which is equipped in the vehicle.

The lane recognizer 130 may be configured to detect a lane located around a vehicle using vehicle surrounding environment images captured by the imaging device 110. In other words, the lane recognizer 130 may be configured to detect lanes other than the road lane that the vehicle is being driven in to determine, for example, the number of lanes on that particular road. Further, the lane recognizer 130 may be configured to determine a type of left lane or right line of a vehicle. The lane recognizer 130 may be configured to determine a type of lane as at least one of a solid line, a dashed line, and a double lane. The lane change determiner 130 may also be configured to determine whether the vehicle changes a lane (e.g., the lane the vehicle is traveling in) to the left or the right of the vehicle. When reliability of the recognized lane is reduced and a distance from a vehicle to a lane is greater than a preset value, the lane change determiner 130 may be configured to determine that a lane change is performed. The space determiner 150 may be configured to determine a width of a space present between the vehicle and the vehicle surrounding object (e.g., a guardrail) using the positional information of the vehicle surrounding object. Further, the space determiner 140 may be configured to determine a width of the left or the right of the vehicle.

The controller 160 may be configured to determine whether a lane change is made based on the type of lane determined by the lane recognizer 130 and the width of the left or right space of the vehicle determined by the space determiner 150. In particular, the controller 160 may be configured to determine that the lane change may be performed when the type of lane is the dashed line (e.g., the lane is depicted with a dashed line) and the width of the left or right space of the vehicle is equal to or greater than the preset width. Further, when the type of lane is not the dashed line or when the width of the left or right space of the vehicle is less than the preset width, the controller 160 may be configured to determine that the lane change may not be performed.

In particular, the preset width may be set to be the width or greater of the lane along which the vehicle drives. In other words, when the width of the space present at the left or right of the vehicle is greater than the width of the lane, the controller 160 may be configured to determine that the space in which the lane change may be performed is secured. Further, the controller 160 may be configured to determine that the lane change may be performed when the type of lane is the dashed line and the condition in which the width of the left or right space of the vehicle is equal to or greater than the preset width is maintained at a preset time (e.g., about 5 seconds) or more. By the time condition, robustness and reliability of the determination on whether the lane change is made may be secured.

Figure 2:
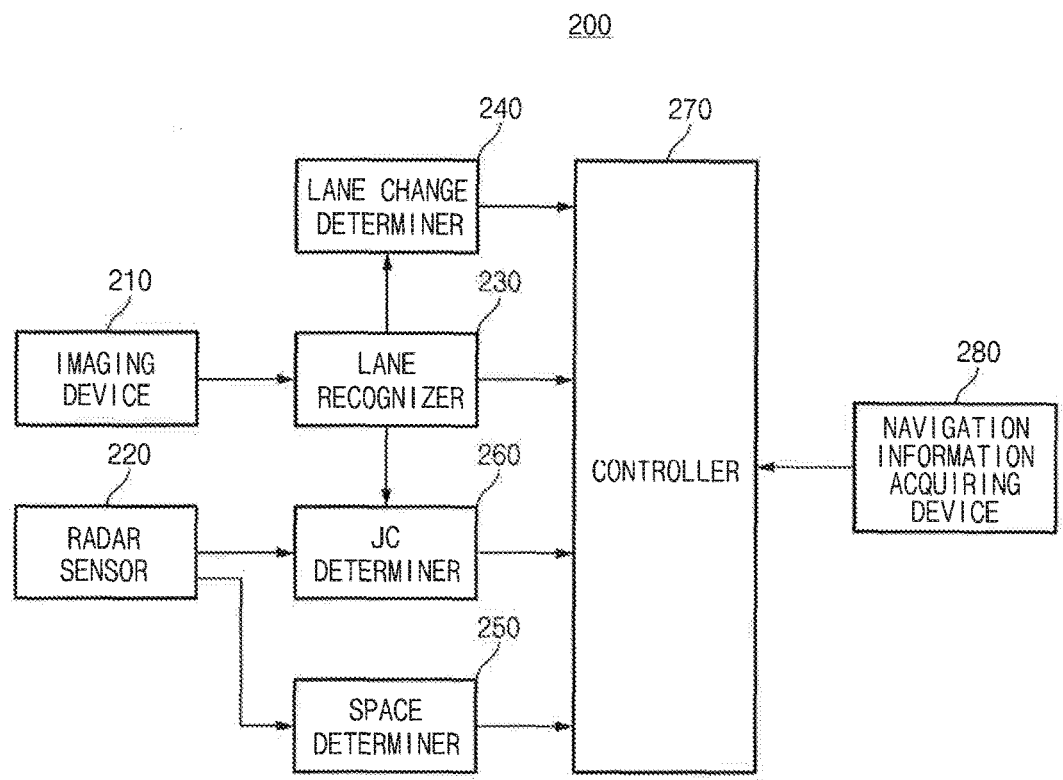
FIG. 2 is an exemplary block diagram illustrating a configuration of a JC entry determining apparatus according to an exemplary embodiment of the present invention.

FIG. 2 is an exemplary block diagram illustrating a configuration of a JC entry determining apparatus according to an exemplary embodiment of the present invention. Referring to FIG. 2, a junction (JC) entry determining apparatus 200 may include an imaging device 210, a radar sensor 220, a lane recognizer 230, a lane change determiner 240, a space determiner 250, a JC determiner 260, a controller 270, and a navigation information acquiring device 280. The controller 270 may be configured to operate the imaging device 210, the radar sensor 220, the lane recognizer 230, the lane change determiner 240, the space determiner 250, the JC determiner 260, and the navigation information acquiring device 280.

Among components of the junction (JC) entry determining apparatus 200, the imaging device 210, the radar sensor 220, the lane recognizer 230, the lane change determiner 240, and the space determiner 250 each correspond to the imaging device 110, the radar sensor 120, the lane recognizer 130, the lane change determiner 140, and the space determiner 150 of the lane change determining apparatus 100, and the operations thereof are the same and therefore the detailed description thereof will be omitted.

The JC determiner 260 may be configured to determine whether a JC entrance is present based on the vehicle surrounding positional information acquired from the radar sensor 120. The JC determiner 260 may be configured to detect the positional information on the guardrail in the vehicle surrounding positional information acquired from the radar sensor 120 and then align the detected positional information in an angle order (e.g., order of greatest angle to smallest angle or any other type of ordering of the angles). Further, the JC determiner 260 may be configured to compare the distances from the vehicle of the aligned positional information and determine that the JC entrance is present when a discontinuous point at which the distance is increased or reduced to a preset distance or greater is present.

Further, the JC determiner 260 may be configured to determine whether the guardrail of the right of the vehicle is parallel with the left lane or the left guardrail of the vehicle to determine that the JC entrance is present when the right guardrail of the vehicle is not parallel with the left lane or the left guardrail of the vehicle. It may be possible to improve the reliability of the determination on the JC entrance by determining whether the right guardrail of the vehicle is parallel with the left lane or the left guardrail of the vehicle.

The controller 270 may be configured to determine whether the vehicle enters the JC entrance based on whether the JC entrance determined by the JC determiner 260 is present, the type of vehicle right lane determined by the lane recognizer 230, and the width of the vehicle right space determined by the space determiner 250. In particular, when the JC entrance is present, the width of the vehicle right space is equal to or greater than the preset width, and the type of lane is the dual lane, the controller 270 may be configured to determine that the vehicle may enter the JC. According to an exemplary embodiment of the present invention, the preset width may be set to be the width of the lane along which the vehicle is being driven. For example, when the width of the space present at the right of the vehicle is equal to or greater than the width of the lane, the contoller 160 may be configured to determine that the vehicle may enter the JC by securing the space in which the lane change may be performed. According to another exemplary embodiment of the present invention, the preset width may be set to be greater than the lane along which the vehicle drives.

Further, the controller 270 may be configured to determine that the vehicle may enter the JC when the JC entrance is present, the width of the right space of the vehicle is equal to or greater than the preset width, and the condition in which the type of lane is the dual lane is maintained at the preset time (e.g., about 3 seconds) or more. By including the time condition, robustness and reliability of the determination on whether the vehicle may enter the JC is made may be secured. Additionally, the navigation information acquiring unit 280 may be configured to acquire the navigation information. The navigation information acquiring unit 280 may be configured to acquire navigation information such as a current position of a vehicle, a driving speed, road information from the navigation equipped within the vehicle. The controller 270 may be configured to use the navigation information acquired by the navigation information acquiring unit 280 in response to determining that the vehicle may enter the JC.

Figure 3:
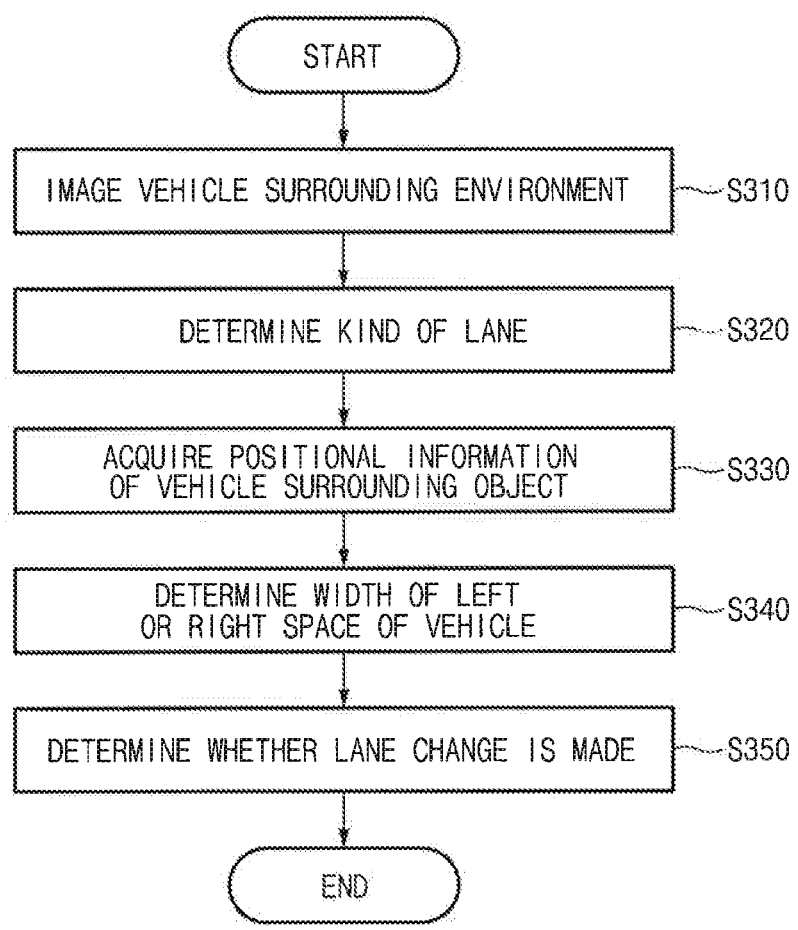
FIG. 3 is an exemplary flow chart for describing a method of determining whether a lane change is made according to an exemplary embodiment of the present invention.

FIG. 3 is an exemplary flow chart for describing a method of determining whether a lane change is made according to an exemplary embodiment of the present invention. Referring to FIG. 3, the lane change determining apparatus 100 may be configured to capture an image of the vehicle surrounding environment (S310). The vehicle surrounding environment image may be captured using the plurality of cameras.

Further, the type of left lane or right lane of the vehicle may be determined using the captured vehicle surrounding environment images (S320). In particular, the type of lane may be determined as one of a solid line, a dashed line, and a double lane (e.g., different depictions of lanes on the road). The positional information of the vehicle surrounding object may be acquired (S330) and the radar sensor may be used to acquire the positional information of the vehicle surrounding object. The acquired positional information may include a distance r and an angle value θ for the vehicle surrounding object from the vehicle. More accurately, the positional information acquired by the radar sensor 120 may include the distance r and the angle value θ for the vehicle surrounding object from the radar sensor which is equipped within the vehicle.

Further, the width of the left or right space of the vehicle may be determined based on the positional information (S340). Whether the lane change of the vehicle is performed may be determined based on the type of lane determined in step S320 and the width determined in step S340 (S350). In particular, when the type of lane is the dashed line and the width of the space is the preset width or greater, the controller 160 may be configured to determine that the lane change may be performed. Further, when the type of lane is not the dashed line or when the width of the left or right space of the vehicle is less than the preset width, the controller 160 may be configured to determine that the lane change may not be performed. In particular, the preset width may be set to be the width of the lane along which the vehicle is being driven. In other words, when the width of the space present at the left or right of the vehicle is greater than the width of the lane, the controller 160 may be configured to determine that the space in which the lane change may be performed is secured.

In addition, when the type of lane is the dashed line and the condition in which the width of the left or right space of the vehicle is equal to or greater than the preset width is maintained at a preset time (e.g., about 5 seconds) or more, the controller 160 may be configured to determine that the lane change may be performed. By including the time condition, robustness and reliability of the determination on whether the lane change is made may be secured. Further, the method of determining whether a lane change is performed may further include determining whether the vehicle changes a lane to the left lane or the right lane. In particular, when the reliability of the recognized lane is reduced and a distance from a vehicle to a lane is greater than a preset value, the lane change determiner 130 may be configured to determine that a lane change is performed.

FIG. 3 illustrates that the vehicle surrounding environment may be photographed and then the positional information of the object may be obtained, but the process of imaging the vehicle surrounding environment and the process of acquiring the positional information of the vehicle surrounding object may have a temporally parallel relationship and therefore may be performed simultaneously.

Figure 4:
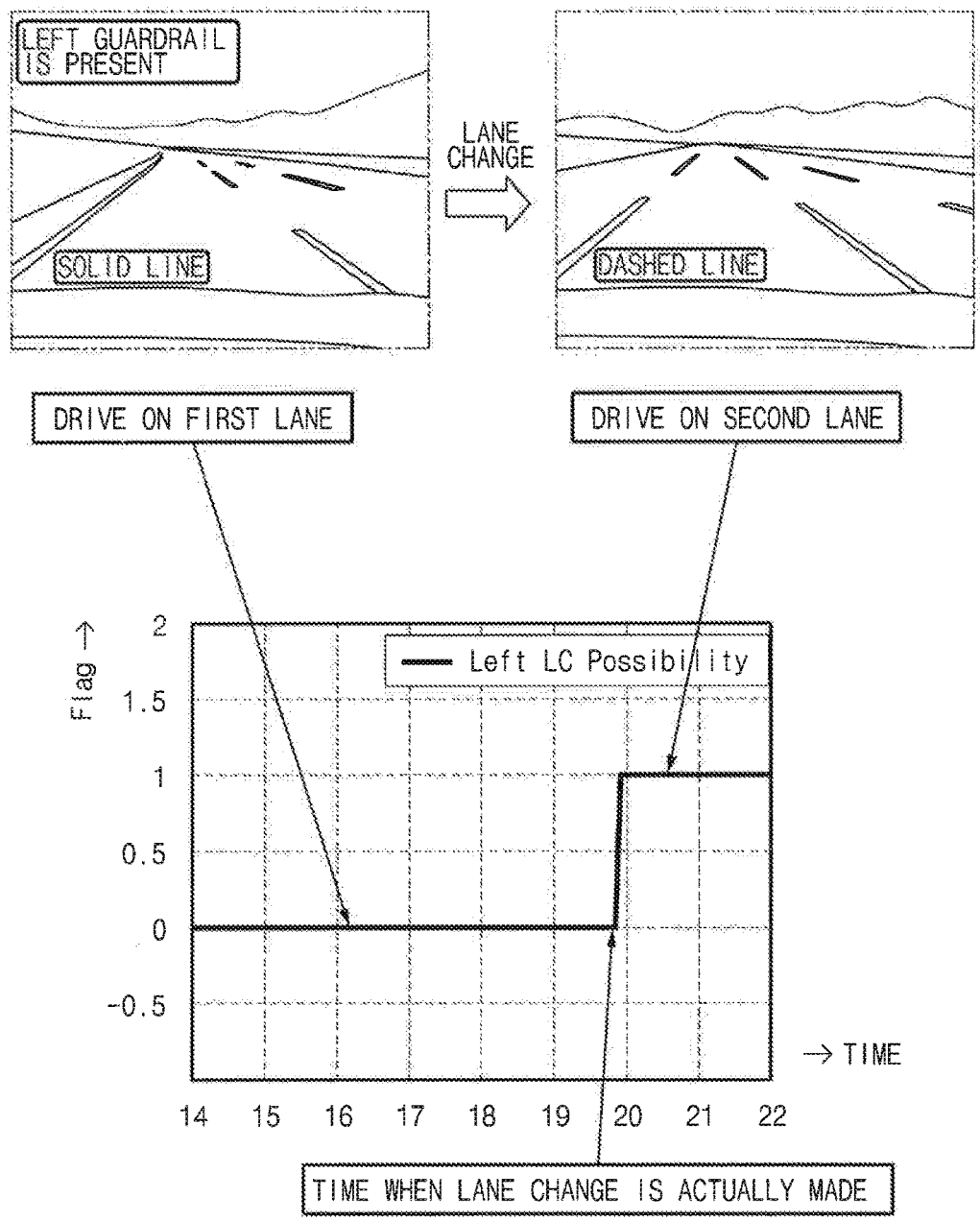
FIG. 4 is an exemplary diagram for describing a flag indicating whether a vehicle changes a lane to a left lane according to an exemplary embodiment of the present invention.

Meanwhile, whether the lane change of the vehicle is performed may be indicated by a flag as described with reference to FIGS. 4 and 5. FIG. 4 is an exemplary diagram for describing a flag indicating whether a vehicle changes a lane to a left lane. Referring to a lower graph of FIG. 4, the flag may be indicated by 0 while a vehicle is being driven on a first lane (that is, there is no lane which may not be changed to the left). The flag is changed to 1 while the vehicle changes a lane to the right lane and thus is being driven on a second lane (that is, there is one lane which may be changed to the left).

Figure 5:
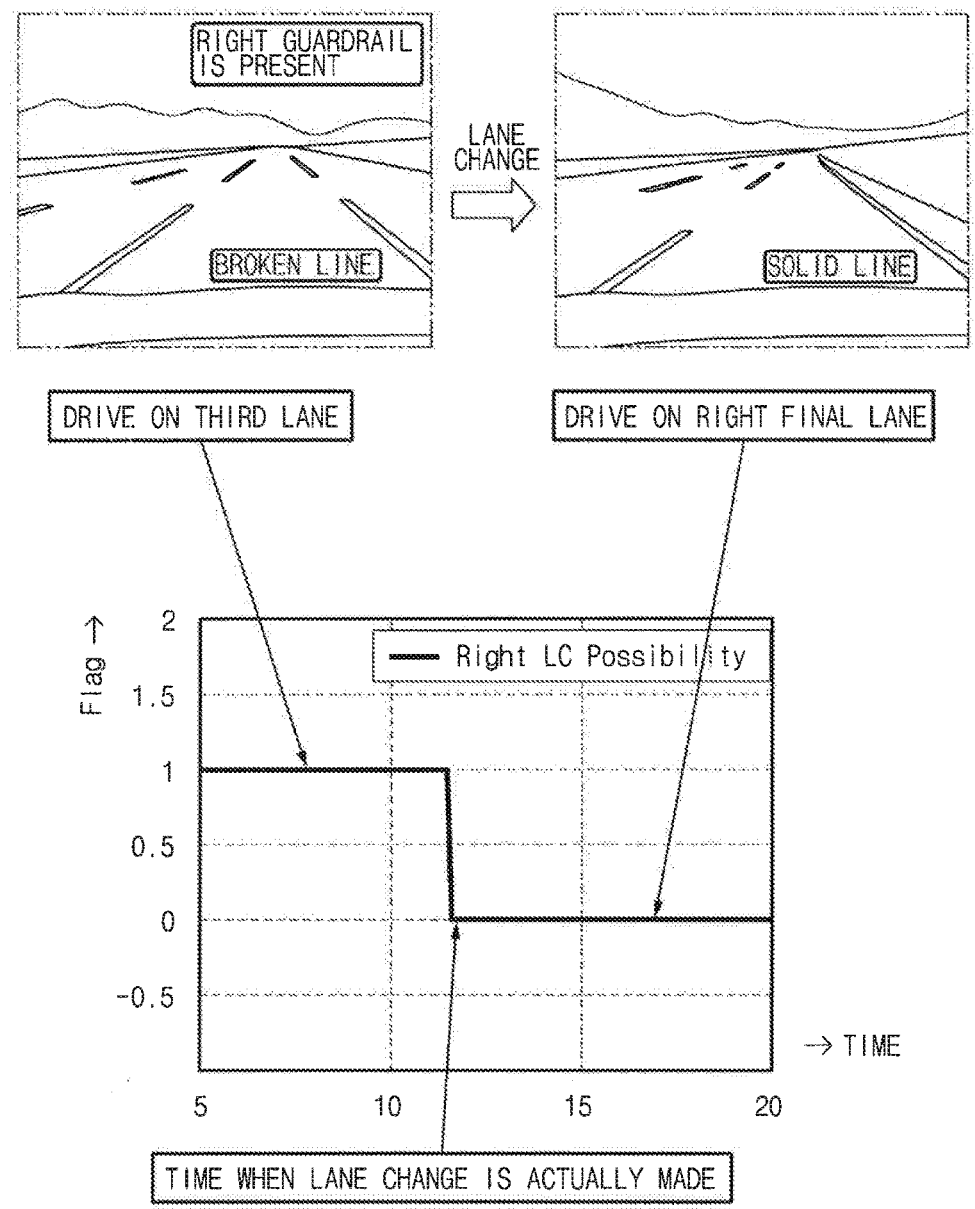
FIG. 5 is an exemplary diagram for describing a flag indicating whether a vehicle changes a lane to a right lane according to an exemplary embodiment of the present invention.

FIG. 5 is an exemplary diagram for describing a flag indicating whether a vehicle changes a lane to a right lane. Referring to a lower graph of FIG. 5 the flag is indicated by 1 while a vehicle is being driven on a third lane (that is, there is one lane which may be changed to the right). The flag is changed to 0 while the vehicle changes a lane to the right lane and thus is being driven on a fourth lane (that is, the is no lane which may be changed to the right) which may be a final lane (e.g., the last lane within the width of the road).

Figure 6:
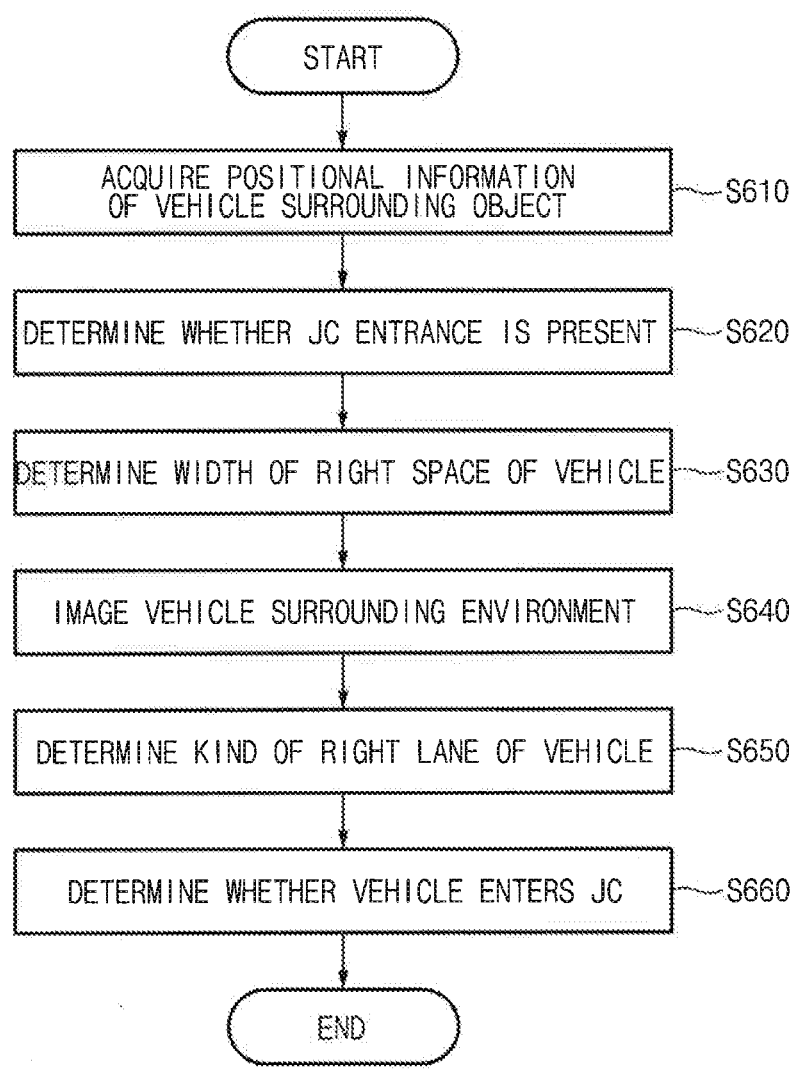
FIG. 6 is an exemplary flow chart for describing a JC entry determining method according to an exemplary embodiment of the present invention.

FIG. 6 is an exemplary flow chart for describing a JC entry determining method according to an exemplary embodiment of the present invention. Referring to FIG. 6, first, the positional information of the vehicle surrounding object may be acquired (S610). The radar sensor may be used to acquire the positional information of the vehicle surrounding object and the acquired positional information may include the distance r and the angle value θ for the vehicle surrounding object from the vehicle. More accurately, the positional information acquired by the radar sensor 120 may include the distance r and the angle value θ for the vehicle surrounding object from the radar sensor which is equipped within the vehicle.

Additionally, the controller may be configured to determine whether the JC entrance is present based an the positional information (620). In particular, the positional information on the guardrail in the vehicle surrounding positional information acquired in step S610 may be detected and the detected positional information may be aligned in the angle order. Further, the controller may be configured to determine that the JC entrance is present when a discontinuous point at which the distance is increased or reduced to the preset distance or more is present by comparing the distances of the aligned positional information. This will be described with reference to FIGS. 7A-7B and 8A-8C.

Figure 7A:
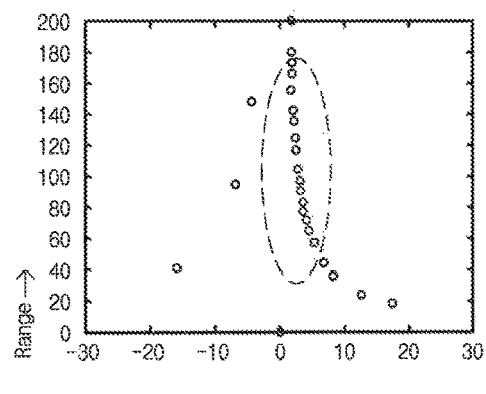
FIGS. 7A-7B are exemplary diagrams for describing a feature of a JC entrance according to an exemplary embodiment of the present invention.
Figure 7B:
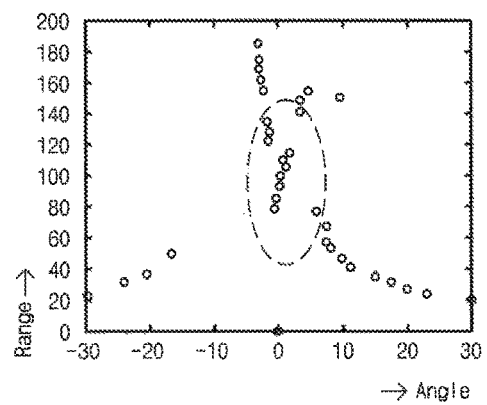

FIGS. 7A-7B are exemplary diagrams for describing a feature of a JC entrance according to an exemplary embodiment of the present invention. FIG. 7A is an exemplary graph in which the positional information at a substantially straight road is indicated by a distance based on an angle and FIG. 7B is an exemplary graph in which the positional information at a road at which a JC access road is present is indicated by a distance based on an angle. Referring to FIG. 7A, as the angle of the positional information (that is, positional information in which an angle is equal to or greater 0°) of the object which is located at the right of the vehicle is increased, the distance may increase. On the other hand, referring to FIG. 7B, as the angle of the positional information of the object which is located at the right of the vehicle is increased, the distance may decrease and may be increased and then reduced again. In other words, at the JC entrance, the discontinuous portion is present at the guardrail and graph characteristics as illustrated in FIG. 7B due to the discontinuous portion may be shown.

Figure 8A:
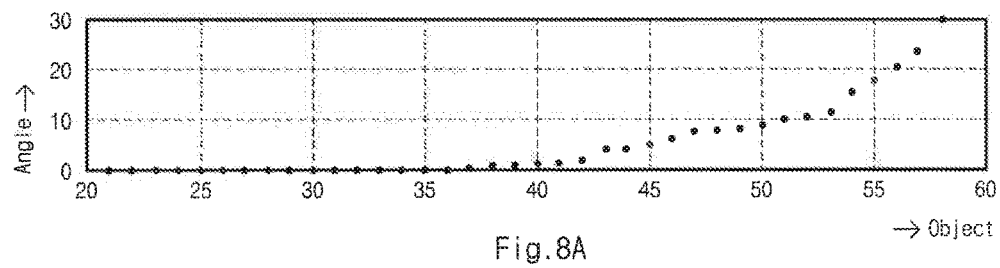
FIGS. 8A-8C are exemplary diagrams for describing a process of determining whether the JC entrance is present according to an exemplary embodiment of the present invention.
Figure 8B:
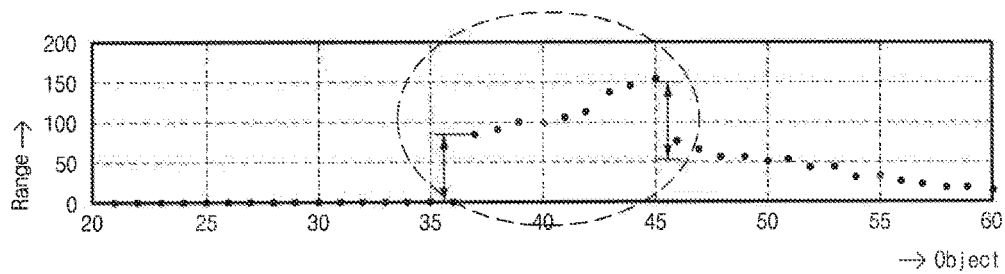
Figure 8C:
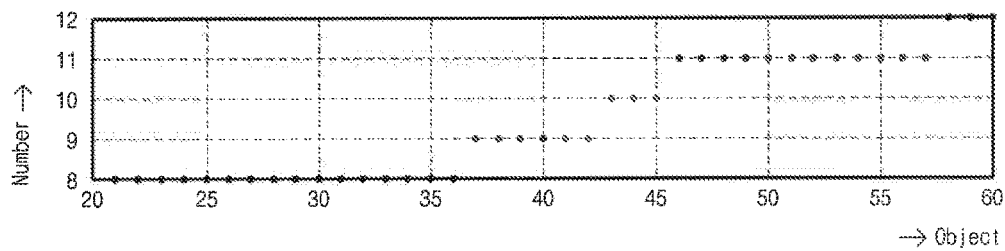

FIGS. 8A-8C are exemplary diagrams for describing a process of determining whether the JC entrance is present according to an exemplary embodiment of the present invention. When the positional information is acquired, the positional information on the guardrail in the acquired positional information may be detected. Further, the positional information detected as illustrated in FIG. 8A may be aligned in the angle order. Further, the controller may be configured to determine whether the discontinuous point at which the distance is increased or reduced to the preset distance or greater is present by comparing the distances of the aligned positional information as illustrated in FIG. 8B. As shown in FIG. 8B, the discontinuous point at which the distance is increased between positional information No. 36 and positional information No. 37 is present and the discontinuous point at which the distance is reduced between positional information No. 45 and positional information No. 46 is present. Therefore, it may be determined that the JC entrance is present between positional information No. 36 to No. 45. Meanwhile, as illustrated in FIG. 8C, entities in which the increased amount of the acquired positional information has a similar tendency are grouped and thus the positional information group on the specific object may be extracted.

Moreover, the width of the right space of the vehicle may be determined based on the positional information of the vehicle surrounding object (S630). The width of the right space of the vehicle may be the distance from the vehicle to the guardrail. The vehicle surrounding environment image may be captured (S640) using the plurality of cameras. Further, the type of right lane of the vehicle may be determined using the imaged vehicle surrounding environment images (S650). In particular, the type of lane may be determined as one of a solid line, a dashed line, and a double lane.

Additionally, the controller may be configured to determine whether the vehicle enters the JC based on whether the JC entrance determined in step S620 is present, the width of the right space of the vehicle determined in step S630, and the type of right lane of the vehicle determined in step S650 (S660). In particular, when the JC entrance is present and the lane may be changed to the right of the vehicle, the controller may be configured to determine that the vehicle enters the JC. When the width of the right space of the vehicle is the preset width or greater and the type of right lane of the vehicle is the double lane, the controller may be configured to determine that the lane may be changed to the right of the vehicle. The preset width may be set to be the width of the lane along which the vehicle is being driven. In other words, when the width of the space present at the right of the vehicle is greater than the width of the lane, the controller 160 may be configured to determine that the space in which the lane change may be performed is secured.

Particularly, when the JC entrance is present, the width of the right space of the vehicle is equal to or greater than the preset width, and the condition in which the right lane of the vehicle is the double lane is maintained at the preset time (e.g., about 5 seconds) or more, the controller may be configured to determine that the lane change may be performed. By including the time condition, robustness and reliability of the determination on whether the vehicle may enter the JC is made may be secured. Further, the controller may be configured to determine whether the vehicle enters the JC based on the navigation information such as the current position of the vehicle, the driving speed, and the road information which is acquired from the navigation.

Meanwhile, the JC entry possibility of the vehicle and the state depending on whether the vehicle enters the JC may be indicated by the flag. This will be described with reference to FIGS. 9 and 13.

Figure 9:
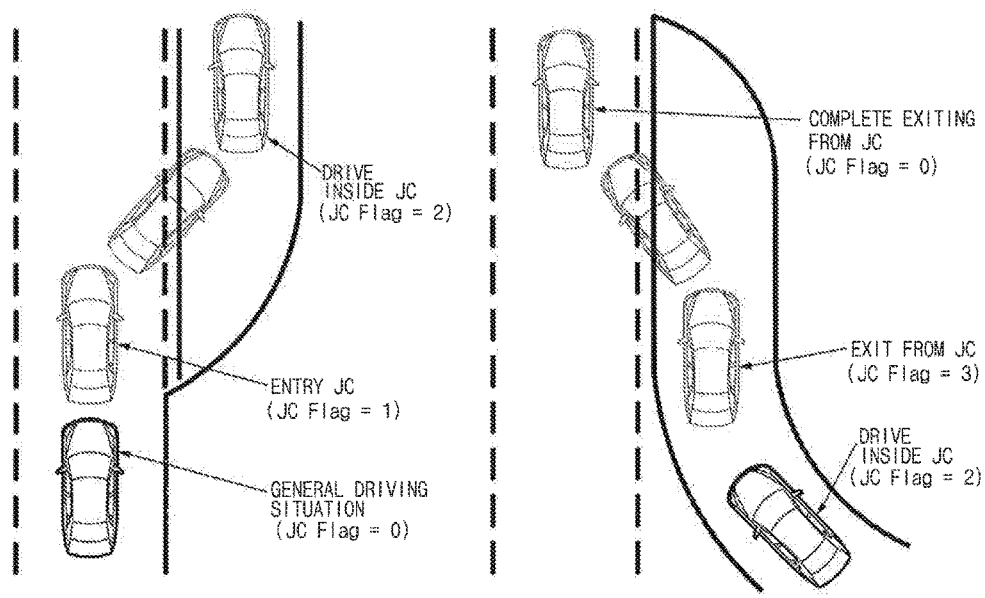
FIG. 9 is an exemplary diagram for describing a flag based on a driving position of a vehicle when the vehicle enters the JC according to an exemplary embodiment of the present invention.

FIG. 9 is an exemplary diagram for describing a flag based on a driving position of a vehicle when the vehicle enters the JC. Referring to FIG. 9, the flag may be set to be 0 when the vehicle is being driven on an expressway. Further, in response to determining that the vehicle enters the JC, the flag may be set to be 1. When the vehicle changes a lane to the right lane of the vehicle and enters the JC, the flag may be set to be 2. Further, in response to determining that the vehicle may exit from the JC, the flag may be set to be 3 and when the vehicle changes a lane to the left lane of the vehicle and thus exits from the JC, the flag may be set to be 0 again.

Figure 10:
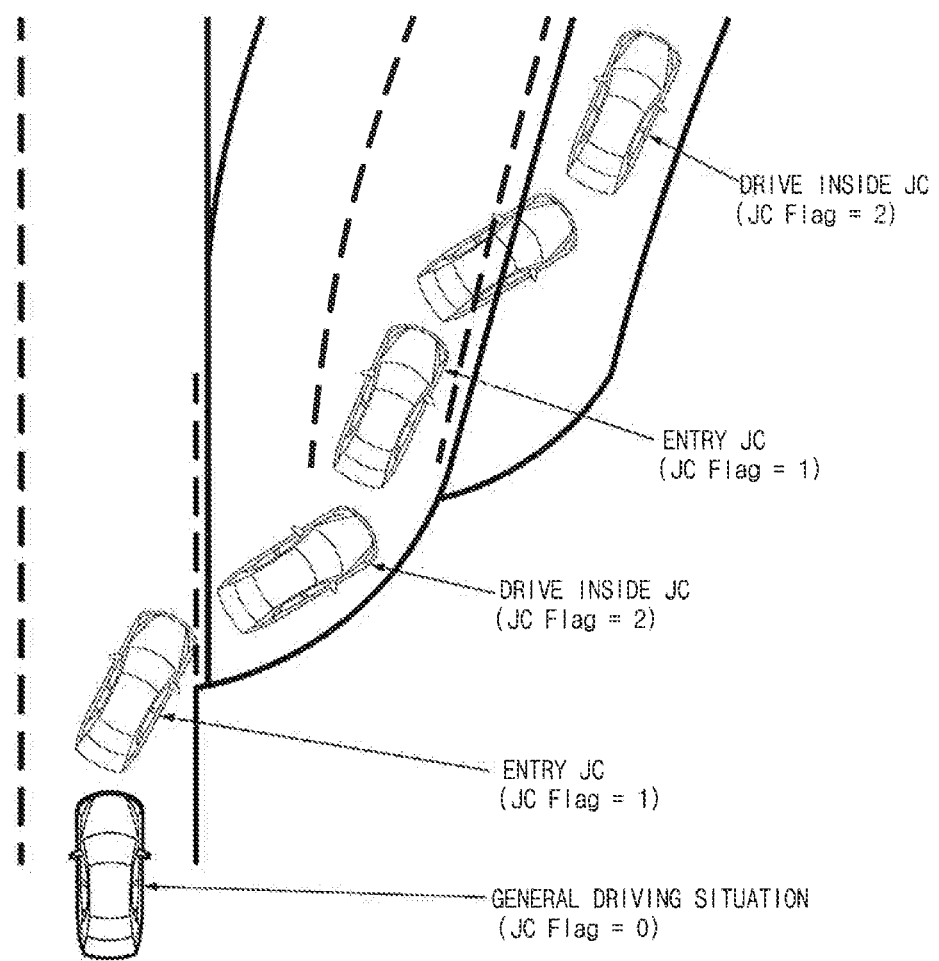
FIG. 10 is an exemplary diagram for describing a flag based on a driving position of a vehicle when the vehicle enters the double JC according to an exemplary embodiment of the present invention.

FIG. 10 is an exemplary diagram for describing a flag based on a driving position of a vehicle when the vehicle enters a double JC. Referring to FIG. 9, the flag may be set to be 0 when the vehicle is being driven on an expressway. Further, in response to determining that the vehicle enters the JC, the flag may be set to be 1. When the vehicle changes a lane to the right lane of the vehicle and enters the JC, the flag may be set to be 2. In response to determining that another JC is shown while the vehicle is being driven within the JC and the vehicle may enter the JC, the flag may be set to be 1 again. When the vehicle changes a lane to the right lane of the vehicle and enters a second JC, the flag may be set to be 2 again.

Figure 11:
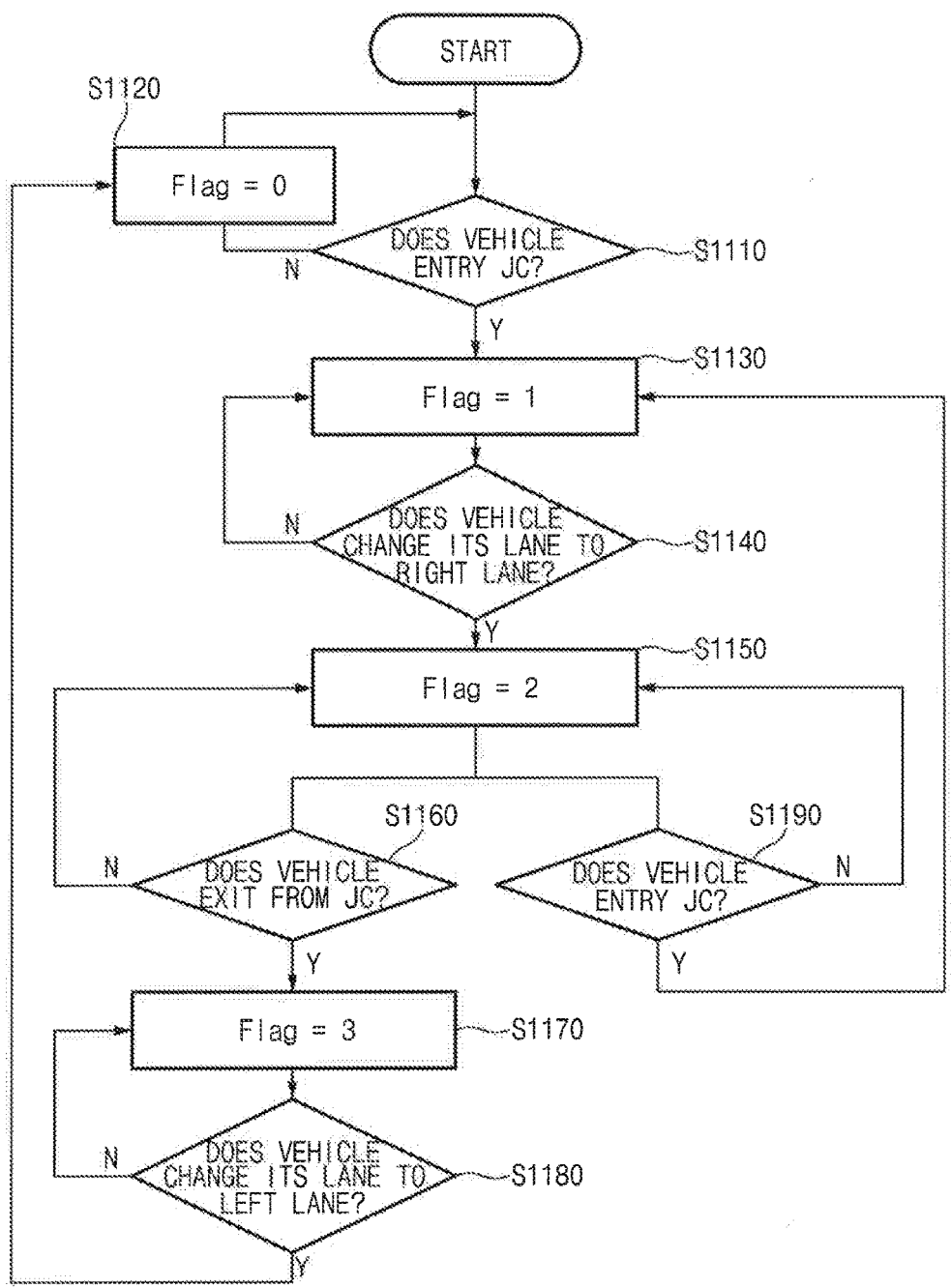
FIG. 11 is an exemplary diagram for describing a process of setting a flag according to an exemplary embodiment of the present invention.
Figure 12:
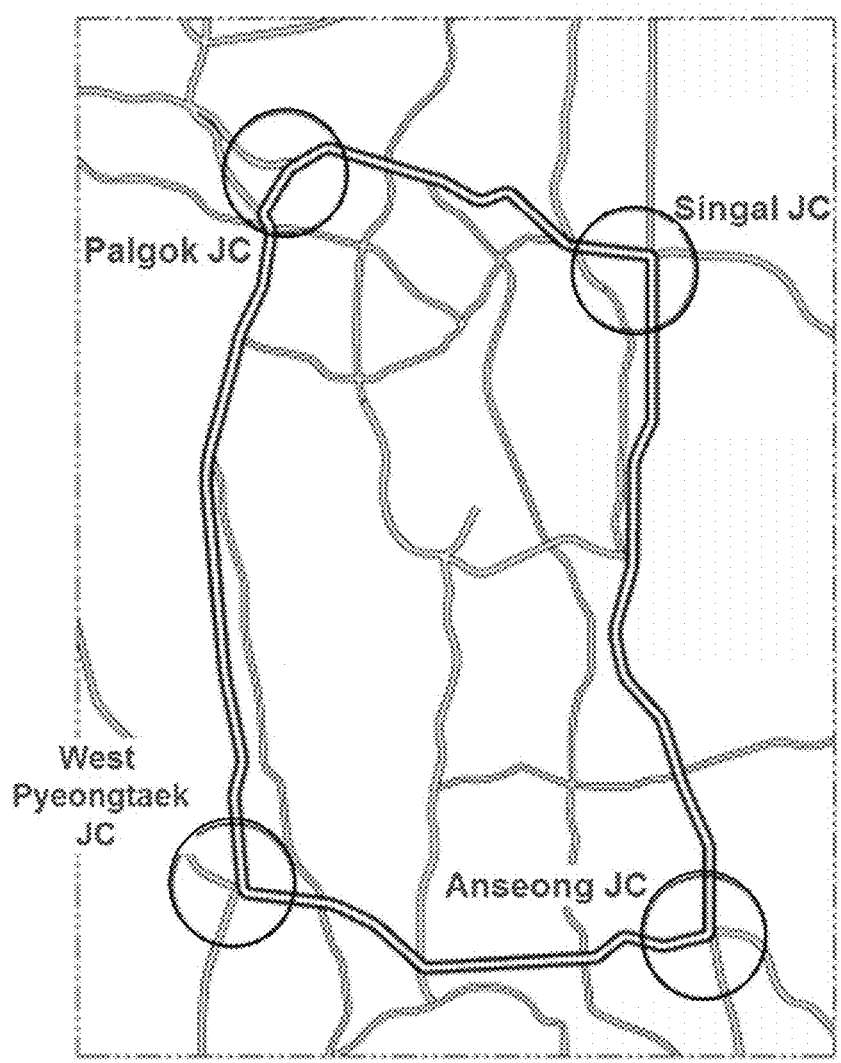
FIG. 12 is an exemplary diagram of a map showing multiple JCs according to an exemplary embodiment of the present invention.

FIG. 11 is an exemplary diagram for describing a process of setting a flag according to an exemplary embodiment of the present invention. First, the controller may be configured to determine whether the vehicle enters the JC (S1110). Whether the vehicle enters the JC may be determined as described with reference to FIG. 3. In response to determining that the vehicle may not enter the JC (S1110-N), the flag may be set to be 0 (1120). In response to determining that the vehicle may enter the JC(S1110-Y), the flag may be set to be 1 (S1130).

Furthermore, the controller may be configured to determine whether the vehicle changes a lane to the right lane when the vehicle may enter the JC (S1140). When the vehicle does not change a lane to the right lane (S1140-N), the flag may be set to be 1 without being changed (S1130). When the vehicle changes a lane to the right lane (S1140-Y), the controller may be configured to determine that the vehicle enters the JC and thus the flag may be set to be 2. Next, the controller may be configured to determine whether the vehicle may exit from the JC and whether the vehicle enters the JC when the vehicle is being driven inside the JC (S1160). In particular, when the width of the left space of the vehicle is equal to or greater than the preset width when the vehicle is being driven inside the JC (that is, when the flag is set to be 2) and the type of left lane of the vehicle is the double lane, the controller may be configured to determine that the vehicle may exit from the JC.

In response to determining that the vehicle may not exit from the JC (S1160-N), the flag may be set to be 2 without being changed (S1150). Additionally, in response to determining that the vehicle exits from the JC (S1160-Y), the flag may be set to be 3. Further, the controller may be configured to determine whether the vehicle changes a lane to the left lane when the vehicle may exit from the JC (S1180). In response to determining that the vehicle does not change a lane to the left lane (S1180-N), the flag may be set to be 3 without being changed. When the vehicle changes a lane to the left lane (S1180-Y), the controller may be configured to determine that the vehicle exits from the JC and thus the flag may be set to be 0.

Meanwhile, the controller may be configured to determine that the vehicle may enter the JC when the vehicle drives inside the JC (S1190). In other words, the controller may be configured to determine whether the vehicle may exit from the JC and the vehicle may enter the JC when the vehicle enters the JC and the flag may be set to be 2. When the width of the right space of the vehicle is equal to or greater than the preset width when the vehicle drives inside the JC and the type of right lane of the vehicle is the double lane, the controller may be configured to determine that the vehicle enters a new JC (e.g., a second JC) inside the JC (e.g., the first JC). Alternatively, the controller may be configured to determine that the vehicle may enter the JC as described with reference to FIG. 3. In response to determining that the vehicle may not enter the JC (S1190-N), the flag may be set to be 2 without being changed. In response to determining that the vehicle enters the JC (S1190-Y), the method may return to step S1130. In other words, after the flag is set to be 1, the controller may be configured to determine whether the vehicle changes a lane to the right lane.

According to the exemplary embodiments of the present invention, it may be possible to effectively predict and control the expected path of the vehicle during autonomous driving by determining whether the lane is changed. It may also be possible to determine the acceleration or the deceleration of the vehicle and secure the safety of the autonomous driving during the autonomous driving of the vehicle by determining the state in which the vehicle enters the JC.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims. Accordingly, such modifications, additions and substitutions should also be understood to fall within the scope of the present invention.

What is claimed is:

1. A junction (JC) entry determining method, comprising:
   acquiring, by a controller, positional information of a vehicle surrounding object using a radar;
   determining, by the controller, whether a junction (JC) entrance is present using the positional information;
   determining, by the controller, a width of a right space of the vehicle using the positional information;
   capturing, by the controller, an image of a vehicle surrounding environment;
   determining, by the controller, a type of right lane of the vehicle using the captured image; and
   determining, by the controller, whether the vehicle enters the JC based on whether the JC entrance is present, the width of the right space of the vehicle, and the type of lane,
   wherein the positional information includes a distance and an angle value from the vehicle to the vehicle surrounding object, and
   wherein the determining whether the JC entrance is present includes:
      detecting, by the controller, positional information on a guardrail in the positional information;
      aligning, by the controller, the detected positional information in angle order; and
      determining, by the controller, whether the JC entrance is present, in response to determining that a discontinuous point at which the distance is increased or reduced to a preset distance or more is prevent by comparing the distances of the aligned positional information.

2. The JC entry determining method according to claim 1, further comprising:
   determining, by the controller, that the vehicle enters the JC when the JC entrance is present, the width of the right space of the vehicle is equal to or greater than a preset width, and the type of lane is a double lane.

3. The JC entry determining method according to claim 2, further comprising:
   determining, by the controller, that the vehicle enters the JC when the JC entrance is present, the width of the right space of the vehicle is equal to or greater than the preset width, and a condition in which the type of lane is the double lane is maintained for a preset time.

4. The JC entry determining method according to claim 2, further comprising:
   determining, by the controller, whether the vehicle enters the JC when the vehicle enters the JC, and when the vehicle changes a lane to the right lane.

5. The JC entry determining method according to claim 4, further comprising:
   determining, by the controller, that the vehicle exists from the JC when the left lane of the vehicle is the double lane while the vehicle is being driven inside the JC and the width of the left space of the vehicle is equal to or greater than the preset width.

6. The JC entry determining method according to claim 5, further comprising:
   determining, by the controller, whether the vehicle exits outside the JC when the vehicle exits from the JC and when the vehicle changes a lane to the left lane.

7. The JC entry determining method according to claim 1, wherein the determining whether the JC entrance is present includes:
   determining, by the controller, that the JC entrance is present when a right guardrail of the vehicle is not parallel with a left lane or a left guardrail of the vehicle.

8. A junction (JC) entry determining apparatus, comprising:
   a radar sensor configured to acquire positional information of a vehicle surrounding object using a radar;
   a controller having a processor and a memory and configured to:
      determine whether a JC entrance is present using the positional information;
      determine a width of a right space of the vehicle using the positional information;
      capture an image of a vehicle surrounding environment;
      determine a type of right lane of the vehicle using the captured image; and
      determine whether the vehicle enters the JC based on whether the JC entrance is present, the width of the right space of the vehicle, and the type of lane,
   wherein the positional information includes a distance and an angle value from the vehicle to the vehicle surrounding object, and
   wherein the controller is further configured to:
      detect positional information on a guardrail in the positional information;
      align the detected positional information in an angle order; and
      determine whether the JC entrance is present, in response to determining that a discontinuous point at which the distance is increased or reduced to a preset distance or more is present by comparing the distances of the aligned positional information.

\* \* \* \* \*